United States Patent
Iijima

(10) Patent No.: US 9,243,517 B2
(45) Date of Patent: Jan. 26, 2016

(54) CARBON DIOXIDE RECOVERY SYSTEM AND METHOD

(75) Inventor: Masaki Iijima, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 13/437,243

(22) Filed: Apr. 2, 2012

(65) Prior Publication Data

US 2012/0255306 A1 Oct. 11, 2012

(30) Foreign Application Priority Data

Apr. 6, 2011 (JP) ................................. 2011-084929

(51) Int. Cl.
*F01K 13/00* (2006.01)
*F01K 7/22* (2006.01)
(Continued)

(52) U.S. Cl.
CPC .............. *F01K 7/22* (2013.01); *B01D 53/1412* (2013.01); *B01D 53/1425* (2013.01); *B01D 53/1475* (2013.01); *F01K 7/025* (2013.01); *F01K 13/00* (2013.01); *F01K 17/00* (2013.01); (Continued)

(58) Field of Classification Search
CPC ...................... B01D 53/1412; B01D 2257/504; B01D 53/1425; B01D 53/1475; F01K 13/00; F01K 17/00; F01K 17/06; F01K 17/04; F01K 7/025; F01K 7/22; Y02C 10/04; Y02C 10/08; Y02C 10/06; Y02E 20/185; Y02E 20/16
USPC ........... 60/676, 649, 653, 686, 645, 662, 673, 60/658, 677, 698
See application file for complete search history.

(56) References Cited

U.S. PATENT DOCUMENTS

| 6,764,530 B2* | 7/2004 | Iijima ............................. 95/183 |
| 6,883,327 B2* | 4/2005 | Iijima et al. ..................... 60/649 |

(Continued)

FOREIGN PATENT DOCUMENTS

| JP | 03-193116 A | 8/1991 |
| JP | 05-184868 A | 7/1993 |

(Continued)

OTHER PUBLICATIONS

Extended European Search Report dated Jul. 5, 2012, issued in corresponding European Patent Application No. 12163240.0 (6 pages).

(Continued)

*Primary Examiner* — Kenneth Bomberg
*Assistant Examiner* — Wesley Harris
(74) *Attorney, Agent, or Firm* — Westerman, Hattori, Daniels & Adrian, LLP

(57) ABSTRACT

A carbon dioxide recovery system includes a high-pressure turbine 11, an intermediate-pressure turbine 12, a low-pressure turbine 13, a main boiler 15 that generates steam 14 for driving these turbines, a carbon dioxide recovery unit 24 including a carbon dioxide absorber 21 that absorbs and reduces carbon dioxide in flue gas (emission gas) G emitted from the main boiler 15 using a carbon dioxide absorbent and an absorbent regenerator 23 that regenerates a carbon dioxide absorbent having absorbed the carbon dioxide using a regenerating superheater 22 to obtain a regenerated carbon dioxide absorbent, an auxiliary boiler 30 that generates saturated water vapor 31 to be supplied to the regenerating superheater 22 in the absorbent regenerator 23, and a steam turbine 32 that is driven by steam from the auxiliary boiler 30.

2 Claims, 4 Drawing Sheets

(51) Int. Cl.
*F01K 7/02* (2006.01)
*F01K 17/06* (2006.01)
*F01K 17/00* (2006.01)
*B01D 53/14* (2006.01)
*F01K 17/04* (2006.01)

(52) U.S. Cl.
CPC ............... *F01K 17/04* (2013.01); *F01K 17/06* (2013.01); *B01D 2252/204* (2013.01); *B01D 2257/504* (2013.01); *B01D 2258/0283* (2013.01); *Y02C 10/04* (2013.01); *Y02C 10/06* (2013.01); *Y02C 10/08* (2013.01); *Y02E 20/16* (2013.01); *Y02E 20/185* (2013.01)

(56) References Cited

U.S. PATENT DOCUMENTS

| | | | |
|---|---|---|---|
| 2003/0131582 A1* | 7/2003 | Anderson et al. | 60/39.55 |
| 2007/0256559 A1* | 11/2007 | Chen et al. | 95/169 |
| 2009/0151318 A1 | 6/2009 | Handagama et al. | |
| 2011/0011088 A1 | 1/2011 | Iijima et al. | |
| 2011/0048011 A1 | 3/2011 | Okita et al. | |

FOREIGN PATENT DOCUMENTS

| | | |
|---|---|---|
| JP | 2001-323807 A | 11/2001 |
| JP | 2004-323339 A | 11/2004 |
| JP | 2009-97507 A | 5/2009 |
| JP | 2011-020090 A | 2/2011 |
| JP | 2011-508842 A | 3/2011 |
| WO | 2007/019632 A1 | 2/2007 |
| WO | 2010/006825 A1 | 1/2010 |
| WO | 2011/029792 A1 | 3/2011 |

OTHER PUBLICATIONS

Australian Notice of Acceptance dated Dec. 13, 2013, issued in corresponding Australian patent application No. 2012201455 (25 pages).

Notice of Allowance dated Jul. 8, 2014, issued in corresponding Canadian Patent Application No. 2770770 (2 pages).

Japanese Office Action dated Jan. 13, 2015, issued in corresponding JP Patent Application No. 2011-084929 with English translation (6 pages).

Office Action dated Apr. 14, 2015, issued in corresponding Japanese Patent Application No. 2011-084929, with English translation (7 pages).

Decision of Dismissal of Amendment and Decision of Rejection dated Jun. 23, 2015, issued in counterpart Japanese application No. 2011-084929, with English translation. (8 pages).

Notice of Acceptance dated Oct. 20, 2015, issued in counterpart Japanese Patent Application No. 2011-084929, with Partial English Translation (3 pages).

* cited by examiner

CARBON DIOXIDE RECOVERY SYSTEM AND METHOD

FIELD

The present invention relates to a carbon dioxide recovery system and a carbon dioxide recovery method that can reliably regenerate a carbon dioxide absorbent even when operation loads of a boiler or a steam turbine in a power generation system vary.

BACKGROUND

The greenhouse effect of $CO_2$ has been recently pointed out as one factor of the global warming phenomenon and it has become an international urgent issue to take measures in preserving earth environments. All fields of human activities that involve burning of fossil fuels are $CO_2$ generation sources, and needs for $CO_2$ emission limitation are becoming increasingly great. Accordingly, methods that enable to bring flue gas of a boiler into contact with an amine $CO_2$ absorbent to reduce or recover $CO_2$ in the flue gas, and methods that enable to store recovered $CO_2$ without releasing $CO_2$ to the atmosphere have been intensively studied for power-generating facilities such as thermal power plants that use a large amount of fossil fuels. As steps that enable to reduce or recover $CO_2$ from flue gas by using a $CO_2$ absorbent as described above, a step of bringing flue gas into contact with a $CO_2$ absorbent in an absorber and a carbon dioxide recovery system that heats an absorbent having absorbed $CO_2$ in a regenerator to liberate $CO_2$ as well as regenerates the absorbent and circulates the regenerated absorbent again in the regenerator to reuse the absorbent are adopted.

This carbon dioxide recovery system causes carbon dioxide contained in gas in the absorber to be absorbed by the absorbent and then be heated in the regenerator, thereby separating the carbon dioxide from the absorbent, so that the separated carbon dioxide is separately recovered and a regenerated absorbent is cyclically used again in the absorber.

To separate and recover carbon dioxide in the regenerator, the absorbent needs to be heated by a regenerating superheater and heating steam at a prescribed pressure needs to be supplied thereto. When $CO_2$ is to be recovered from flue gas of a practical power plant, a large amount of steam is required to regenerate the absorbent.

To supply the steam, methods that enable to bleed steam from a steam turbine of a power generation system, that enable to bleed steam from each header between a high-pressure turbine (HP) and an intermediate-pressure turbine (MP) or between an intermediate-pressure turbine (MP) and a low-pressure turbine (LP), or that enable to recover power from bled steam using a steam turbine and supply emission to a regenerating superheater in a $CO_2$ recovery system have been proposed (see Japanese Patent Application Laid-open No. 2004-323339).

CITATION LIST

Patent Literature

Patent Literature 1: Japanese Patent Application Laid-open No. H03-193116

Patent Literature 2: Japanese Patent Application Laid-open No. 2004-323339

SUMMARY

Technical Problem

The methods mentioned above involve significant installation of a steam system or a turbine in the existing power generation system and also, both in the existing and newly-built power generation systems, greatly change the steam pressure along with changes in loads of power-generating facilities or changes in steam to be used in the $CO_2$ recovery system or a use amount thereof while the $CO_2$ recovery system uses steam at a fixed pressure. Therefore, quite complicated system control is required to address these situations.

Besides, because these systems use superheated steam for the regenerating superheater to recover $CO_2$, the steam is used by decreasing the temperature with water before the steam enters the regenerating superheater and accordingly there is energy loss in the steam pressure.

The present invention has been achieved in view of the above problems, and an object of the present invention is to provide a carbon dioxide recovery system and a carbon dioxide recovery method that enable to reliably regenerate a carbon dioxide absorbent without imposing loads on a boiler and steam turbine facilities.

Solution to Problem

According to an aspect of the present invention, a carbon dioxide recovery system includes: a high-pressure turbine, an intermediate-pressure turbine, and a low-pressure turbine; a main boiler that generates steam for driving these turbines; a carbon dioxide absorber that absorbs and reduces carbon dioxide in flue gas emitted from the main boiler by using a carbon dioxide absorbent; a carbon dioxide recovery unit that heats a carbon dioxide absorbent having absorbed the carbon dioxide by using a regenerating superheater and regenerates a carbon dioxide absorbent by using a absorbent regenerator; an auxiliary boiler that generates saturated water vapor or almost-saturated water vapor to be supplied to the regenerating superheater in the absorbent regenerator; and a steam turbine that is driven by steam from the auxiliary boiler.

Advantageously, in the carbon dioxide recovery system, the steam turbine is driven by using the steam from the auxiliary boiler, and a $CO_2$ compressor that compresses $CO_2$ emitted from the absorbent regenerator is driven by the steam turbine, and saturated water vapor or almost-saturated water vapor of turbine emission emitted from the steam turbine is supplied to the regenerating superheater.

Advantageously, in the carbon dioxide recovery system, the steam turbine is driven by using the steam from the auxiliary boiler, a power generator is driven by the steam turbine to generate power, and saturated water vapor or almost-saturated water vapor of turbine emission emitted from the steam turbine is supplied to the regenerating superheater.

According to another aspect of the present invention, a carbon dioxide recovery method of recovering carbon dioxide absorbed in the carbon dioxide absorbent by using the carbon dioxide recovery system according to any one of described above.

Advantageous Effects of Invention

According to the present invention, the independent auxiliary boiler is provided and steam is supplied by the auxiliary boiler to the regenerating superheater in the absorbent regenerator. Accordingly, also when operation loads of the main boiler or the steam turbines in the power generation system

DESCRIPTION OF EMBODIMENTS

The present invention will be explained below in detail with reference to the accompanying drawings. The present invention is not limited to the embodiment, and when there are a plurality of embodiments, configurations made by combining these embodiments are also included in the present invention. In addition, constituent elements in the following embodiments include those that can be easily assumed by persons skilled in the art, or that are substantially equivalent.

First Embodiment

Figure 1:
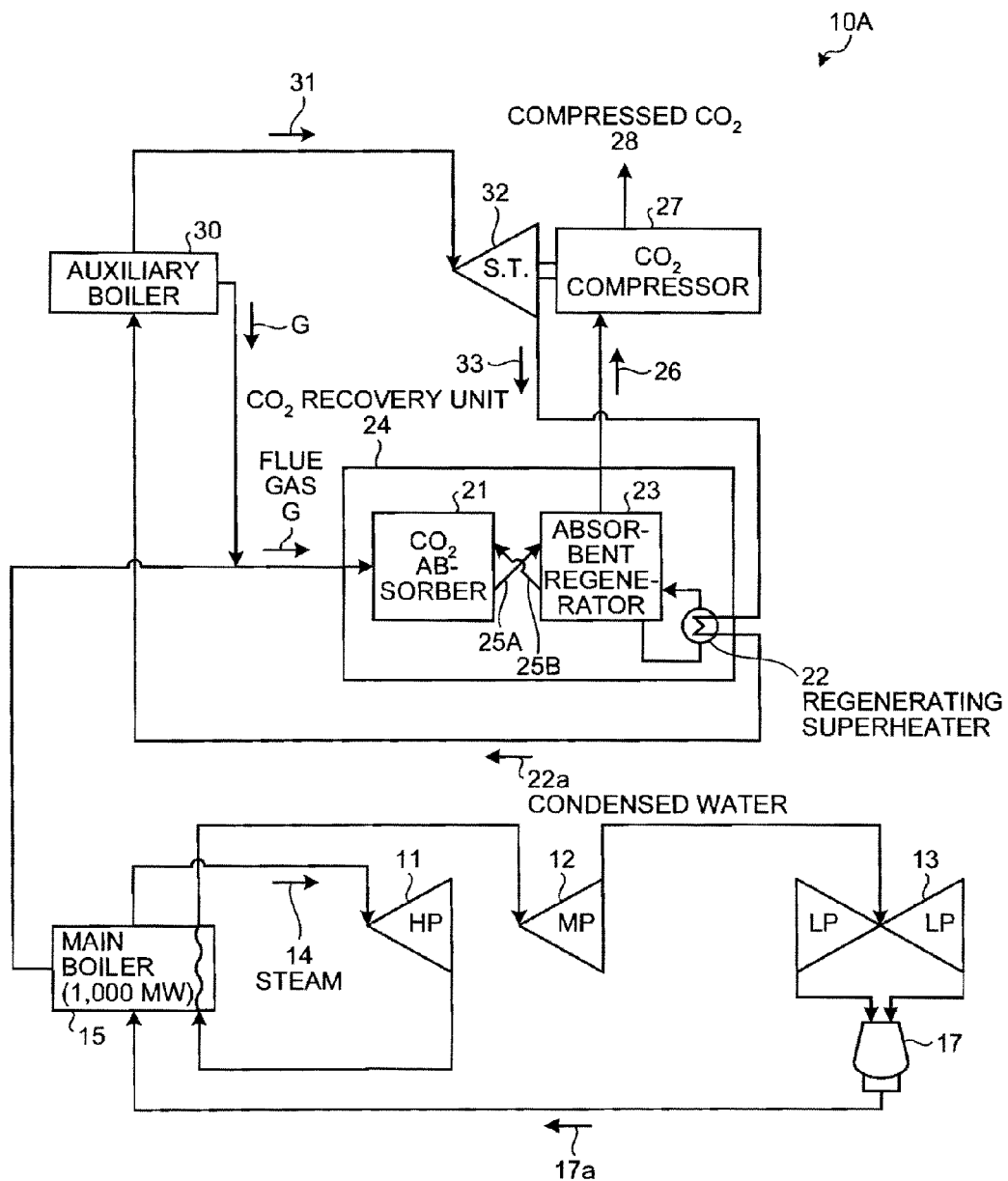
FIG. 1 is a schematic diagram of a carbon dioxide recovery system according to a first embodiment of the present invention.

A carbon dioxide recovery system according to a first embodiment of the present invention is explained with reference to the drawings. FIG. 1 is a schematic diagram of a carbon dioxide recovery system according to the first embodiment.

As shown in FIG. 1, a carbon dioxide recovery system 10A includes a high-pressure turbine 11, an intermediate-pressure turbine 12, a low-pressure turbine 13, a main boiler 15 that generates steam 14 for driving these turbines, a carbon dioxide recovery unit ($CO_2$ recovery unit) 24 that includes a carbon dioxide absorber ($CO_2$ absorber) 21 that absorbs and reduces carbon dioxide in flue gas (emission gas) G emitted from the main boiler 15 using a carbon dioxide absorbent and an absorbent regenerator 23 that regenerates a carbon dioxide absorbent having absorbed the carbon dioxide using a regenerating superheater 22 to obtain a regenerated carbon dioxide absorbent, an auxiliary boiler 30 that generates saturated water vapor 31 to be supplied to the regenerating superheater 22 of the absorbent regenerator 23, and a steam turbine 32 that is driven with steam from the auxiliary boiler 30.

Reference sign 17 denotes a condenser, and 17a and 22a denote condensed water.

The high-pressure and high-temperature steam 14 generated and heated by the main boiler 15 drives the high-pressure turbine 11, then is resuperheated by a resuperheater (not shown) in the main boiler 15 as high-pressure turbine emission, and sent to the intermediate-pressure turbine 12 and then to the low-pressure turbines 13 as resuperheated intermediate-pressure steam.

Emission from the low-pressure turbine 13 is condensed by the condenser 17, and condensed water 17a is sent to the boiler as boiler water supply.

An amine absorbent can be cited as an example of the carbon dioxide absorbent that absorbs $CO_2$. Specifically, monoethanolamine, diethanolamine, triethanolamine, methyldiethanolamine, diisopropanolamine, and diglycolamine as alkanolamine, and also hindered amines can be cited as examples. Solutions of one of these or mixed solutions of two or more of these can be also used. Usually, a monoethanolamine solution is preferably used.

The carbon dioxide absorbent is composed of a carbon dioxide absorbent (rich solution) 25A that has absorbed carbon dioxide in the absorber 21 and a regenerated carbon dioxide absorbent (lean solution) 25B that is regenerated by releasing carbon dioxide using the regenerating superheater 22 in the regenerator 23, and an absorber 17 and a regenerator 19 are cyclically reused.

$CO_2$ gas 26 accompanied by water vapor emitted from the absorbent regenerator 23 is compressed by a $CO_2$ compressor 27 to obtain compressed $CO_2$ 28.

In the present invention, when $CO_2$ is to be recovered from the main boiler 15 or gas turbine flue gas of the power generation system or the like, the auxiliary boiler 30 is provided, and the $CO_2$ compressor 27 is driven by the steam turbine 32 using the high-temperature and high-pressure steam 31 generated in the auxiliary boiler 30 and then turbine emission 33 is introduced into the regenerating superheater 22 of the $CO_2$ recovery unit 24.

Instead of supplying the $CO_2$ gas to the $CO_2$ compressor 27, a power generator can be driven to introduce the turbine emission 33 into the regenerating superheater 22 of the $CO_2$ recovery unit 24.

In this system, the $CO_2$ compressor 27 can bring steam at a power-generator driving turbine outlet to an almost saturated state. Accordingly, there is no need to decrease the temperature of the steam, thereby reducing energy loss.

As a result, according to the present invention, change of the steam system is not required in the case of existing power-generating facilities. Accordingly, even when the power generation loads in the power-generating facilities vary, stable steam is supplied from the auxiliary boiler 30 to the regenerating superheater 22 in the $CO_2$ recovery unit, so that $CO_2$ recovery can be stably achieved.

Also in newly-built power-generating facilities other than the existing power-generating facilities, load changes can be easily addressed.

Furthermore, the high-temperature and high-pressure almost-saturated steam 31 from the auxiliary boiler 30 independently installed can be introduced into the regenerating superheater 22 of the $CO_2$ recovery unit, thereby reducing energy supply loss.

$CO_2$ in flue gas generated from the auxiliary gas 30 can be also recovered, which prevents reduction in a $CO_2$ recovery rate.

Test Example

Figure 4:
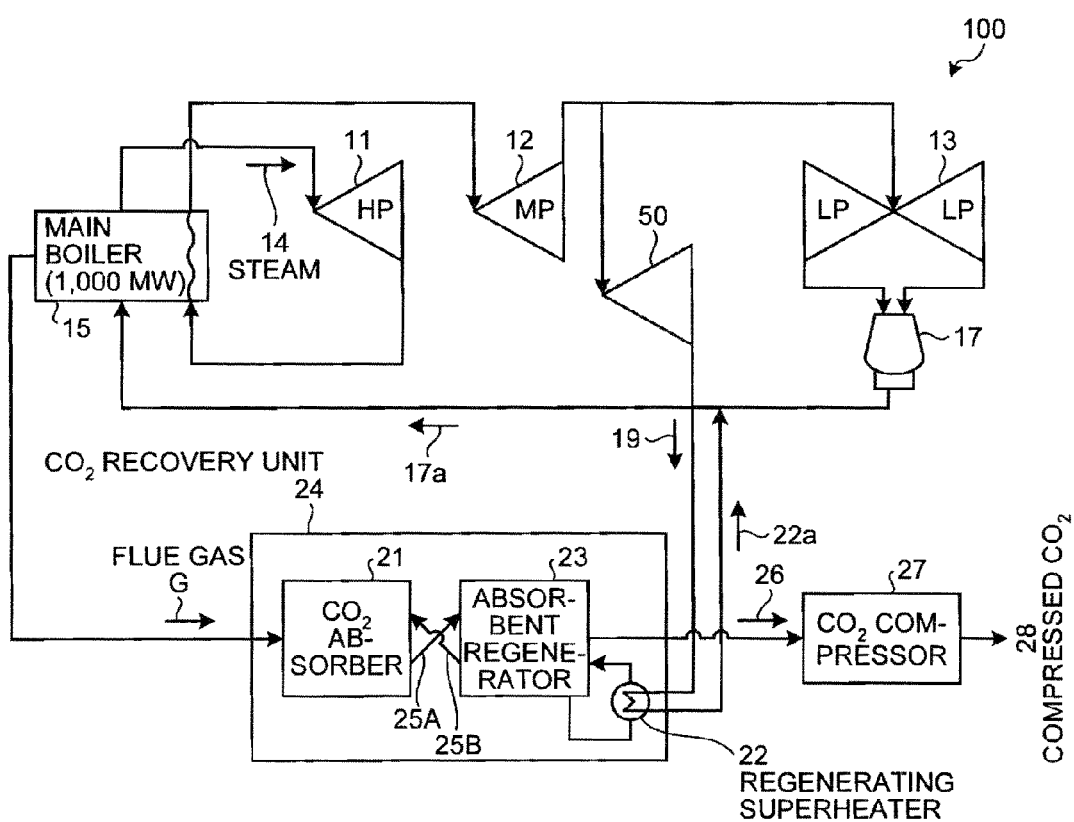
FIG. 4 is a schematic diagram of a carbon dioxide recovery system according to a conventional technique.

FIG. 4 is a schematic diagram of a carbon dioxide recovery system according to a conventional technique. As shown in FIG. 4, the carbon dioxide recovery system according to the conventional technique includes an auxiliary turbine 50 that extracts steam from a middle portion between the intermediate-pressure turbine 12 and the low-pressure turbine 13 and recovers power using the steam. This recovery system uses emission steam 19 emitted from the auxiliary turbine 50 as a heat source of the regenerating superheater 22 of the carbon dioxide regenerator 23.

For example, recovery of $CO_2$ from flue gas in a 1,000-MW coal combustion thermal power plant was examined.

An amount of steam of an ultra-super critical pressure boiler of the 1,000-MW coal combustion thermal power plant is 2,836 tons (T)/hour (H), and an amount of $CO_2$ generated from boiler flue gas is 733 T/H.

When assuming that 90% of $CO_2$ is recovered, an amount of recovered $CO_2$ is 660 T/H (15,840 T/D).

An amount of steam required by the $CO_2$ recovery unit 24 associated with the $CO_2$ recovery is 792 T/(3-kgG saturated water vapor conversion).

Table 1 shows this result.

It is confirmed in Table 2 that, in a case where a steam turbine output is 880 MW, 95 MW is consumed as $CO_2$ compressor power and the like and that the total output is 785 MW, resulting in an output decrease by about 21.5% in total.

In contrast, as shown in Table 3, when the auxiliary boiler 30 equivalent to 390 MW is provided, for example, an amount of steam generated together with the main boiler 15 becomes 1,106 T/H.

When assuming that 90% of $CO_2$ is recovered in the main boiler 15, an amount of recovered $CO_2$ is 660 T/H (15,840 T/D). When similarly assuming that an amount of $CO_2$ recovered in the auxiliary boiler is 257.4 T/H, the total amount of recovered $CO_2$ is 22,018 T/D.

When the auxiliary boiler is provided, power generation output is 1,000 MW+233 MW=1,223 MW.

It is confirmed that 132 MW is consumed as $CO_2$ compressor power and the like and that the total output is 1,091 MW, resulting in an output decrease by about 21.5% in total.

Therefore, it is confirmed that the output decreases in the case where the conventional auxiliary turbine is used and in the case where the auxiliary boiler is used are equal and that the system can be operated more stably in the case where the auxiliary boiler of the present invention is separately provided when the load variation in the power-generating facilities is considered.

TABLE 1

| 1,000 MW ultra-super critical pressure boiler | |
| --- | --- |
| Steam | 2,836 T/H |
| $CO_2$ generation amount | 733 T/H |
| $CO_2$ recovery amount | 660 T/H (90% recovery) = 15,840 T/D |
| Steam required to recover $CO_2$ | 792 T/H (3 KgG. saturation) |

TABLE 2

| Steam turbine output | 880 MW |
| --- | --- |
| $CO_2$ compressor power etc. (consumption) | 95 MW |
| Total output | 785 MW |
| Output decrease | 21.5% |

TABLE 3

| Auxiliary boiler | Equivalent to 390 MW |
| --- | --- |
| Steam amount | 1,106 T/H |
| $CO_2$ recovery amount | Total = 660 + 257.4 = 917.4 T/H = 22,018 T/D |
| Power generation output | 1,000 MW + 233 MW = 1,223 MW |
| $CO_2$ compressor etc. (consumption) | 132 MW |
| Total output | 1,091 MW coal-fired accessory power |
| Output decrease | 21.5% |

Second Embodiment

Figure 2:
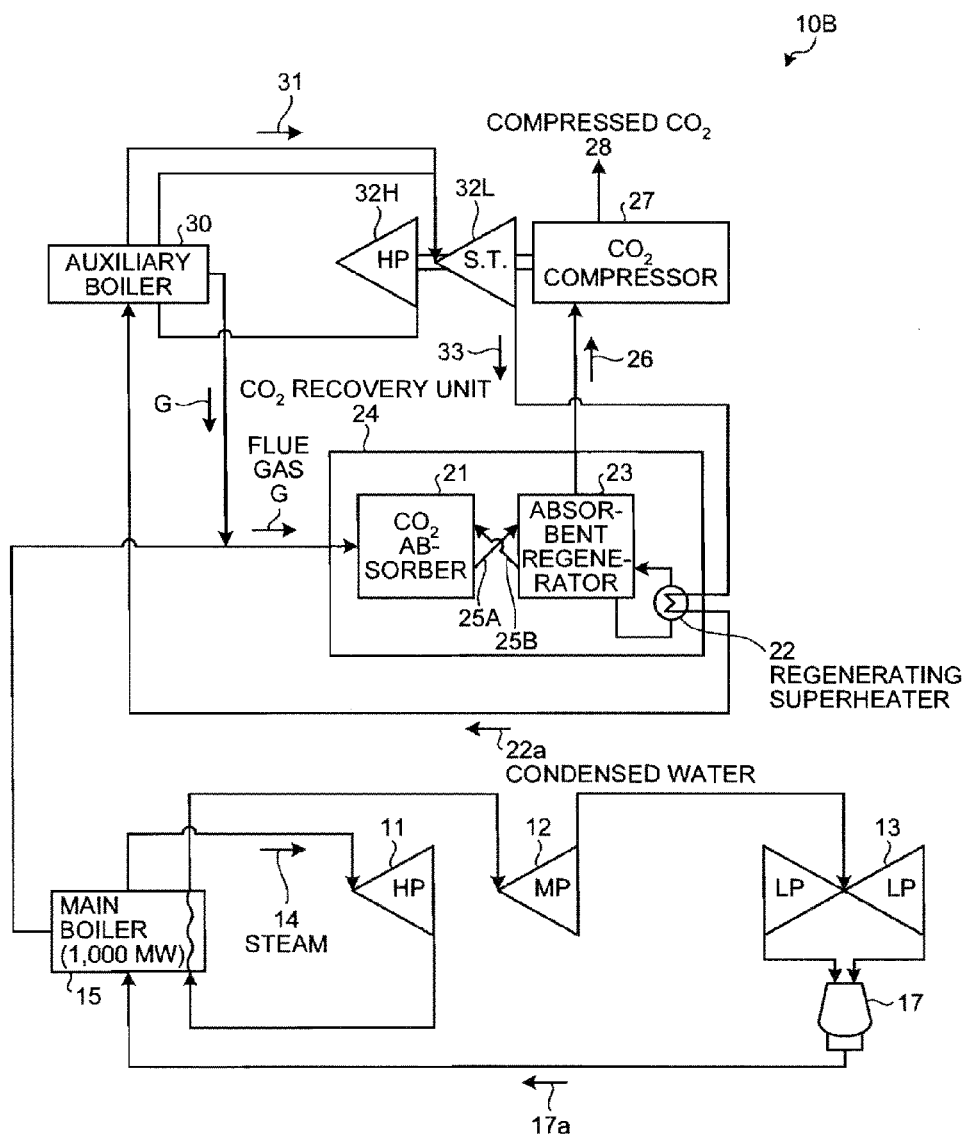
FIG. 2 is a schematic diagram of a carbon dioxide recovery system according to a second embodiment of the present invention.

A carbon dioxide recovery system according to a second embodiment of the present invention is explained with reference to the drawings. FIG. 2 is a schematic diagram of a carbon dioxide recovery system according to the second embodiment.

As shown in FIG. 2, a carbon dioxide recovery system 10B according to the second embodiment includes two steam turbines in the carbon dioxide recovery system 10A of the first embodiment, one of which is a high-pressure steam turbine 32H and is installed adjacent to a low-pressure steam turbine 32L.

This enables the $CO_2$ compressor or a power generator (not shown) to be driven by the two steam turbines 32H and 32L.

Third Embodiment

Figure 3:
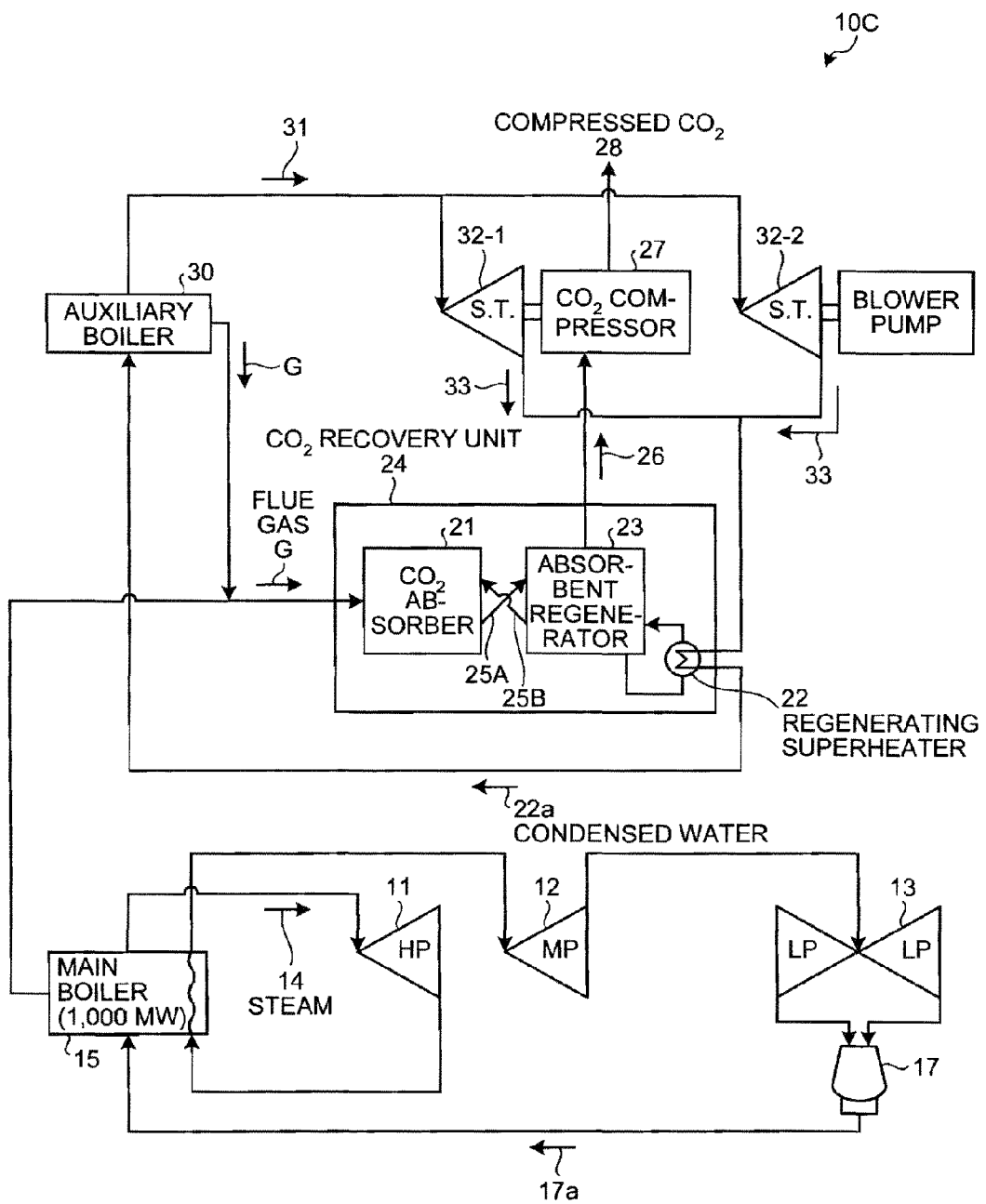
FIG. 3 is a schematic diagram of a carbon dioxide recovery system according to a third embodiment of the present invention.

A carbon dioxide recovery system according to a third embodiment of the present invention is explained with reference to the drawings. FIG. 3 is a schematic diagram of a carbon dioxide recovery system according to the third embodiment.

As shown in FIG. 3, a carbon dioxide recovery system 10C according to the second embodiment includes two steam turbines 32-1 and 32-2 in the carbon dioxide recovery system 10A according to the first embodiment, in which the first turbine 32-1 is provided with the $CO_2$ compressor and the second turbine 32-2 is provided with a blower pump, and the $CO_2$ compressor and the blower pump are driven by these turbines.

This enables the $CO_2$ compressor or a power generator (not shown), the blower pump, and the like to be driven by the two steam turbines 32-1 and 32-2.

REFERENCE SIGNS LIST 10A to 10C carbon dioxide recovery system
11 high-pressure turbine
12 intermediate-pressure turbine
13 low-pressure turbine
14 steam
15 main boiler
G flue gas
21 carbon dioxide absorber (absorber)
23 absorbent regenerator (regenerator)
24 carbon dioxide recovery unit
30 auxiliary boiler
31 steam
32 steam turbine
33 turbine emission

The invention claimed is:

1. A carbon dioxide recovery system comprising:
a high-pressure turbine, an intermediate-pressure turbine, and a low-pressure turbine;
a main boiler that generates steam for driving these turbines and receives a first condensed water generated via these turbines;
a first steam line that supplies the steam sequentially to the high-pressure turbine, the intermediate-pressure turbine, and the low-pressure turbine and returns the first condensed water to the main boiler;
a carbon dioxide recovery unit including:
a carbon dioxide absorber having a carbon dioxide absorbent that absorbs and reduces carbon dioxide in flue gas emitted from the main boiler; and
an absorbent regenerator having a regenerating superheater that heats the carbon dioxide absorbent so as to regenerate the carbon dioxide absorbent;
an auxiliary boiler that is provided downstream of the regenerating superheater, receives a second condensed water generated via the regenerating superheater and generates saturated water vapor or almost-saturated water vapor to be supplied to the regenerating superheater in the absorbent regenerator;

a first steam turbine that is provided downstream of the auxiliary boiler, driven by steam from the auxiliary boiler, provided upstream of the regenerating superheater and emits turbine emission to the regenerating superheater; and a second steam line that supplies the saturated water vapor or almost-saturated water vapor sequentially to the first steam turbine and the regenerating superheater and returns the second condensed water to the auxiliary boiler; wherein a line for supplying carbon dioxide in flue gas emitted from the auxiliary boiler to the carbon dioxide absorber is provided.

2. The carbon dioxide recovery system according to claim 1, further comprising:

a second steam turbine that is driven by steam from the auxiliary boiler and emits turbine emission to the regenerating superheater; and a $CO_2$ compressor that is driven by the first steam turbine and compresses $CO_2$ emitted from the absorbent regenerator, wherein the second steam turbine is provided parallel to the first steam turbine.

* * * * *